United States Patent [19]

Chiariello

[11] 4,240,603
[45] Dec. 23, 1980

[54] SUPPORT ASSEMBLY

[75] Inventor: Ned A. Chiariello, Burlington, Wis.

[73] Assignee: Keystone Ferrule & Nut Corporation, Burlington, Wis.

[21] Appl. No.: 41,688

[22] Filed: May 23, 1979

[51] Int. Cl.³ .............................................. A47G 29/00
[52] U.S. Cl. .................................. 248/125; 248/159; 248/171; 248/288.3
[58] Field of Search ............... 248/121, 122, 124, 125, 248/166, 165, 169, 181, 159, 171, 288 A; 403/84, 90

[56] References Cited

U.S. PATENT DOCUMENTS

| | | | |
|---|---|---|---|
| 926,114 | 6/1909 | Hall | 403/90 X |
| 1,043,387 | 11/1912 | Astruck | 248/159 X |
| 1,271,557 | 7/1918 | Forsyth | 248/125 |
| 2,703,690 | 3/1955 | Petrick et al. | 248/124 |
| 3,076,557 | 2/1963 | Husted et al. | 248/156 X |
| 3,312,438 | 4/1967 | Goetz et al. | 248/165 |
| 3,467,033 | 9/1969 | Sienkiewicz et al. | 248/156 X |
| 3,690,610 | 9/1972 | Peirce | 248/159 |
| 3,704,645 | 12/1972 | Grauso | 403/90 X |
| 3,908,945 | 9/1975 | Shapiro | 248/181 X |
| 4,047,684 | 9/1977 | Kobayashi | 248/122 |

*Primary Examiner*—J. Franklin Foss
*Attorney, Agent, or Firm*—Wallenstein, Spangenberg, Hattis & Strampel

[57] ABSTRACT

A portable support assembly for use as a floodlight lamp system, comprising a stand which includes a base member and interconnectible extensions whereby a stand of a desired height can be provided. The base member has outwardly extendible legs for maintaining the stand in a stable, upright position, and is provided with storage means for the interconnectible extensions whereby the stand can be reduced to a compact unit when not in use. The assembly further desirably includes a universal clamp for attachment to the interconnectible extensions of the stand comprising the assembly. The clamp incorporates a swivable ball and support rod arrangement to which is attached a floodlight lamp, for example. The clamp enables such a lamp to be supported at any desired height on the stand and at any desired angle with relation to an object or subject.

8 Claims, 18 Drawing Figures

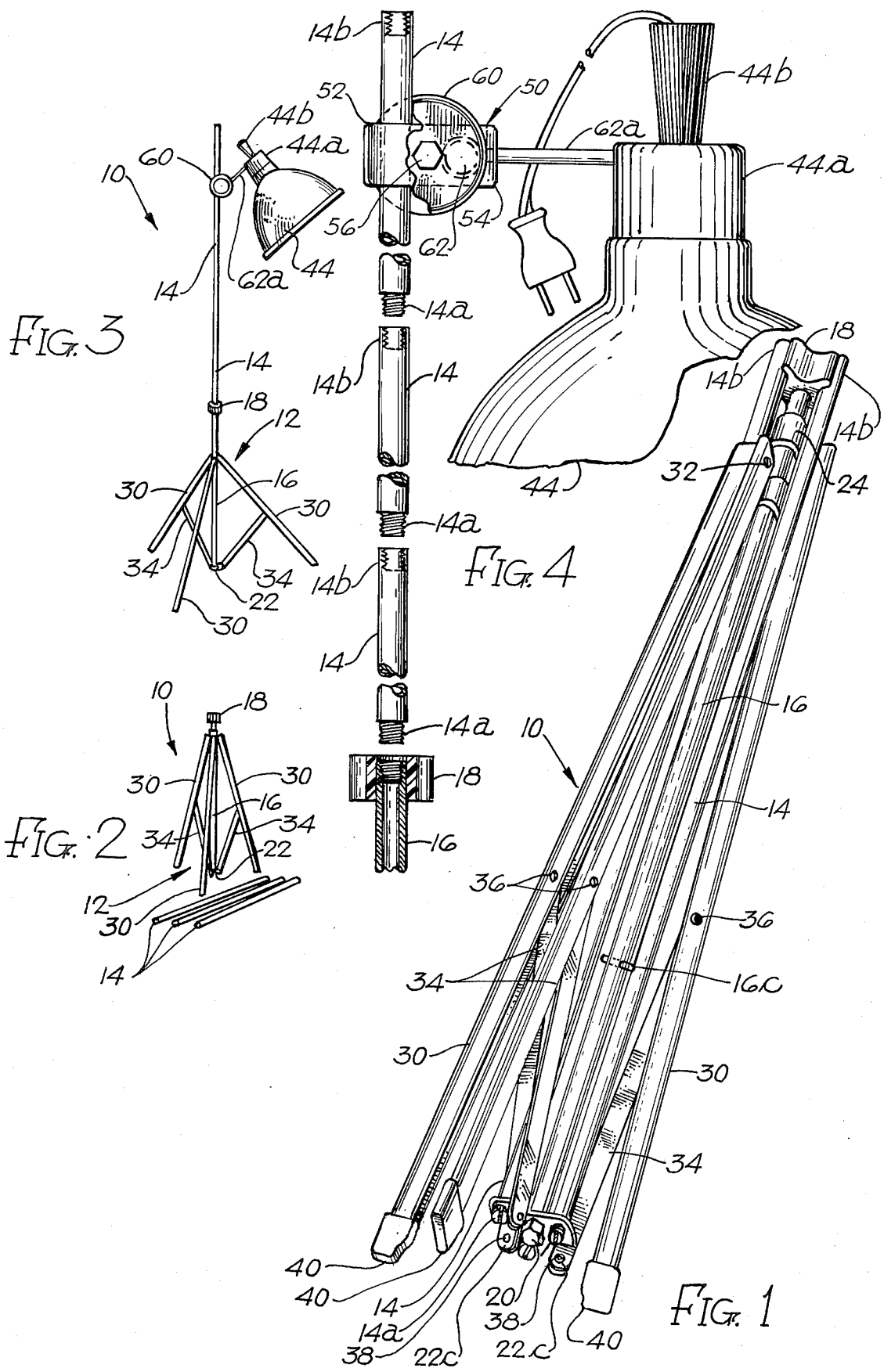

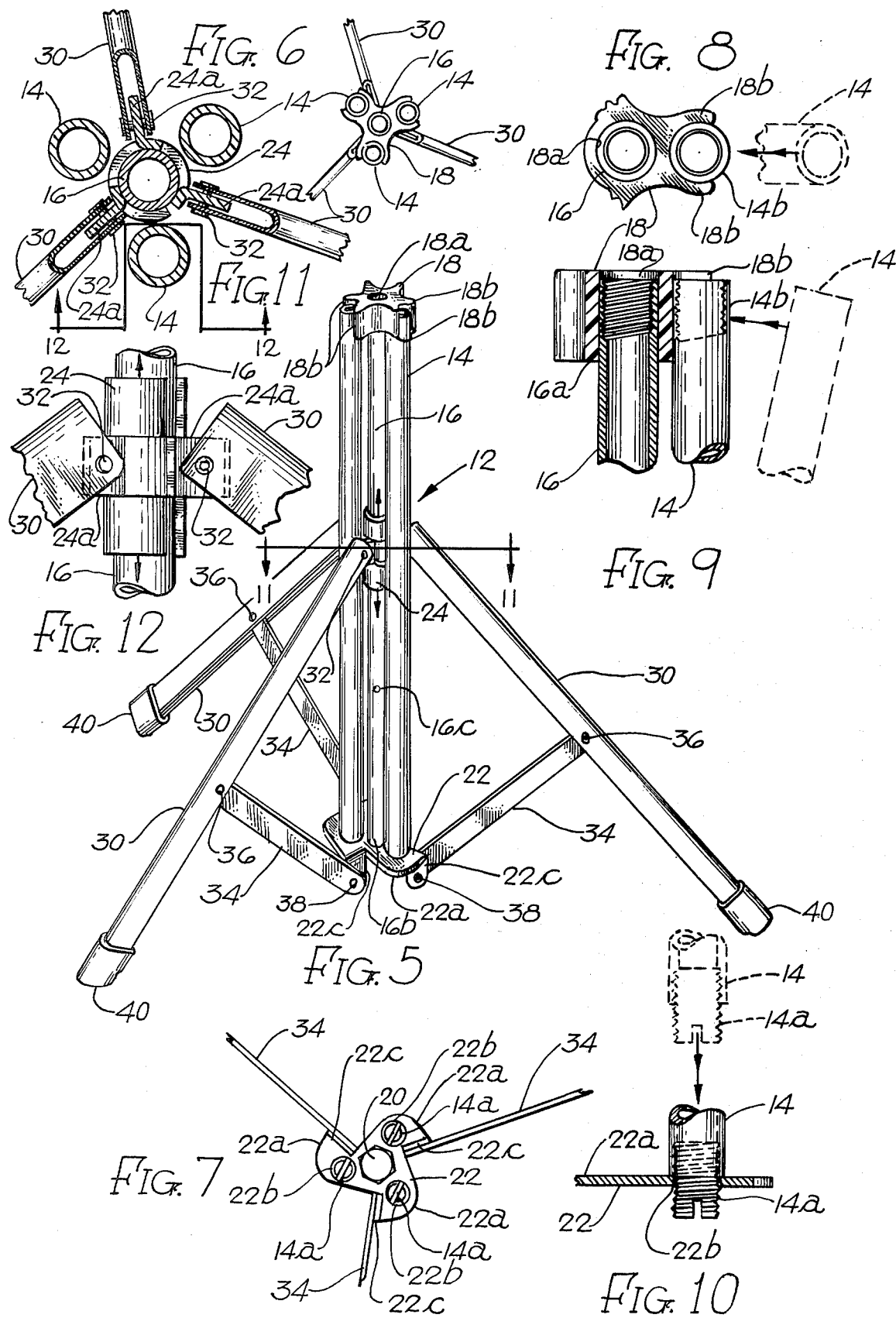

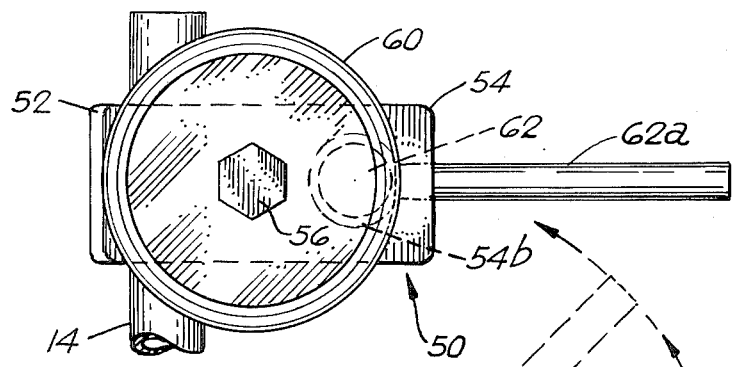
FIG. 14
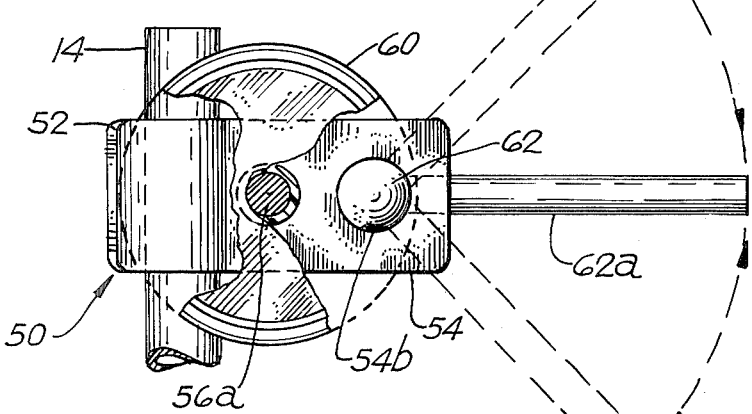
FIG. 15
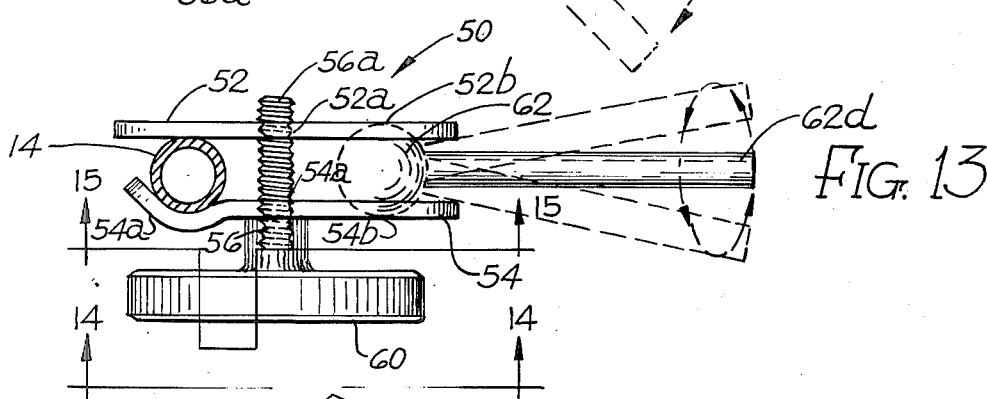
FIG. 13
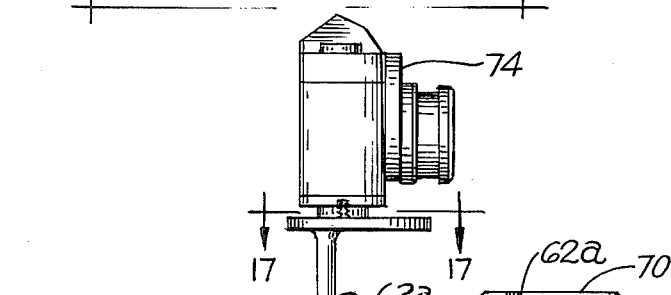
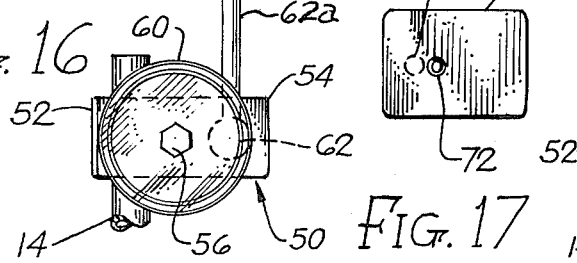
FIG. 16  FIG. 17
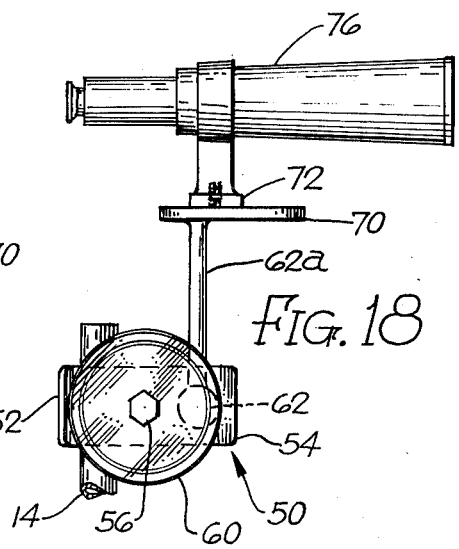
FIG. 18

SUPPORT ASSEMBLY

The present invention relates to a portable support assembly having particular utility as a floodlight lamp system.

Floodlight lamp stands heretofore used for portrait lighting, copy lighting, product photography, and the like, share one or more shortcomings, chief among which are their cumbersomeness, not only from the standpoint of transporting and storing them, but, also, from the standpoint of setting them up for use, and their inability, after they are set up for use, to be easily adjusted to a desired height to satisfy particular lighting requirements thereby burdening a user with the expense of having to purchase both short and tall stands in order to cope with each lighting problem.

In accordance with the present invention, a stand, especially useful as a photofloodlight lamp stand, has been evolved which not only can be stored and transported in a uniquely compact form, but, also, can be adjusted in height to meet substantially any lighting needs. The stand, while being light in weight, provides a highly stable support for floodlight lamps at all levels of height adjustment. Assembly of the stand for use, and disassembly for storage and transport, can be achieved quickly and easily without the need for a tool of any kind. In accordance with another aspect of the invention, a clamp is provided for the stand for supporting a photofloodlight lamp, or the like, at any desired height on the stand. The clamp also enables ready adjustment of the angle at which a lamp, for example, is positioned with relation to a subject or object being photographed.

The stand of the present invention comprises, in brief, a base portion having a plurality of outwardly extendible legs positioned thereon for maintaining the stand in a stable, upright condition during use. The base portion is provided with spaced bracket and retaining clip means for detachably supporting a plurality of extensions when the stand is not in use. The extensions are interconnectible and are adapted to be supported by the base portion of the stand. Any one, or all, of the extensions can be used to provide a stand of any desired height.

The clamp which comprises the other aspect of the invention includes a pair of extension engaging plate members carried on an externally threaded shaft having a handle attached to an end thereof. The plate members are provided with opposed, ball-receiving openings. A ball, having an outwardly extending support rod connected thereto, is swivably engaged in the openings. The support rod connected to the ball can be secured to a floodlight lamp, or to a small platform, or table, for supporting a camera, telescope, or the like. The clamp can readily be positioned at any desired height on a supporting standard by means of the plate members, and the ball enables a lamp, or the like, secured on the rod connected to the ball, to be adjusted at any angle with respect to an object or subject.

The foregoing, and other features and advantages of the invention will become apparent from the description to follow taken in conjunction with the accompanying drawings in which:

FIG. 1 is a view in perspective of an embodiment of the stand of the present invention in a folded condition;

FIG. 2 is a view in perspective, on a smaller scale, of said embodiment showing the base member of the stand in an upright position and the interconnectible extensions separated from the base member;

FIG. 3 is a view in perspective showing said embodiment of the stand supporting a photofloodlight lamp;

FIG. 4 is an enlarged fragmentary exploded view partly in section of said embodiment showing the female and male mating ends of the base member and the extensions of the stand;

FIG. 5 is an enlarged view in perspective of the base member of said embodiment of the stand;

FIG. 6 is a fragmentary view of the base member shown in FIG. 5 as viewed from above;

FIG. 7 is a fragmentary view of the base member shown in FIG. 5 as viewed from below;

FIG. 8 is an enlarged fragmentary plan view of the retaining clip positioned at the top of the column comprising the base member of the stand;

FIG. 9 is an enlarged fragmentary side view partly in section, of the retaining clip as illustrated in FIG. 8;

FIG. 10 is an enlarged fragmentary side view partly in section showing the male end of one of the extensions of the stand in engagement with the bracket at the bottom of the column comprising the base member;

FIG. 11 is a fragmentary sectional view taken substantially along line 11—11 of FIG. 5;

FIG. 12 is a fragmentary view of the leg engaging sleeve on the column of the base member of the stand as viewed substantially along line 12—12 of FIG. 11;

FIG. 13 is a view of an embodiment of the clamp of the present invention as seen from above when engaged on a standard or support such as the stand of this invention;

FIG. 14 is a view of said embodiment of the clamp as viewed substantially along line 14—14 of FIG. 13;

FIG. 15 is a view, partly in section, of the clamp taken substantially along line 15—15 of FIG. 13;

FIG. 16 is a view in elevation showing the clamp of the present invention being used as a support for a camera;

FIG. 17 is a view taken substantially along line 17—17 of FIG. 16; and

FIG. 18 is a view in elevation of the clamp being used as a support for a telescope.

The embodiment of the stand illustrated, and designated generally by reference numeral 10, comprises a base portion or member 12, and three interconnectible extensions 14, each having an externally threaded male end 14a and an internally threaded female end 14b.

The base member 12 has a column 16 to the upper, internally threaded end 16a of which is secured a retaining clip 18 and to the lower, internally threaded end 16b of which is secured, as by a bolt 20, a bracket 22. The clip 18 advantageously is provided with a central opening 18a therethrough, and the upper end 16a of the column 16 is press-fitted into the opening 18a. As best shown in FIGS. 6 and 8, the clip 18 is formed with three pairs of equally spaced apart, outwardly extending, curved, resilient walls 18b—18b adapted to snugly releasably engage the end 14b of each of the interconnectible extensions 14.

The bracket 22, as best shown in FIGS. 5, 7 and 10, has three equally spaced apart, wing-like portions 22a each of which is provided with an opening 22b therethrough. The openings 22b in the portions 22a are adapted to receive the male end 14a of the extensions 14. The openings 22b in the bracket 22, and the curved, resilient walls 18b—18b of the retaining clip 18, cooperate to maintain the extensions 14 on the base member 12 when the stand 10 is not in use, or when less than all of the extensions 14 are utilized to provide a stand of a desired height.

The column 16 of the base member 12 has a sleeve 24 snugly, slidably engaged thereon. The sleeve 24 is provided with three equally spaced apart arms 24a which advantageously have been struck from the sleeve 24, and, therefore, are integral with the sleeve. The arms 24a are adapted to pivotally engage the upper ends of three legs 30 for supporting and maintaining the stand 10 in a stable, upright position during use. As best shown in FIGS. 11 and 12, the legs 30 are generally inverted U-shape in cross-section, and the arms 24a are received between the side walls of the legs 30. A rivet 32 desirably is employed to pivotally secure the upper ends of the legs 30 on the arms 24a of the sleeve 24. Stop means, such as a pin 16c, is provided on the column 16 to limit the downward extent of the movement of the sleeve 24 on the column 16.

As shown in FIG. 5, struts or braces 34 pivotally interconnect the legs 30 to the bracket 22 of the base member 12. The upper end of each of the braces 34 is received between the side walls of the legs 30 at a point approximately intermediate the ends of the legs 30, and is desirably secured to the legs 30 by a rivet 36. The lower end of each of the braces 34 advantageously is pivotally secured, as by a rivet 38, to downwardly extending ears 22c struck from the bracket 22. The lower ends of the legs 30 may be provided with non-skid end caps 40.

In FIGS. 3 and 4, the stand 10 is shown in combination with a photofloodlight lamp 44. The lamp 44 is supported on one of the extensions 14 of the stand 10 by a clamp 50. The clamp 50, as more clearly shown in FIGS. 13–15, comprises a pair of rectangularly shaped extension engaging plates 52 and 54. The plate 54 advantageously is curved outwardly along its outer vertical margin to provide a slightly cupped wall portion 54a, the curvature of which conforms substantially to the curvature of the outer wall of the extensions 14. Each of the plates 52 and 54 is provided with a centrally located bore 52a and 54a, respectively, therethrough. The bore 52a is tapped to enable it to be threadably engaged on the externally threaded shank or shaft 56a of a hex-headed bolt 56. The bore 54a of the plate 54 is not tapped, and is of size to enable the plate 54 to freely move on the shaft 56a of the bolt 56. An enlarged knob, or handle, 60 is secured on the hex-shaped head of the bolt 56. The outer peripheral edge of the handle 60 desirably is knurled to facilitate loosening and tightening of the plates 52 and 54 in relation to the extensions 14.

The plates 52 and 54 are further provided with opposed, enlarged bores or openings 52b and 54b for receiving and supporting a ball 62. The ball 62 has an outwardly extending arm, pin or rod 62a to the outer end of which is attached the base 44a of the lamp 44. The ball and rod arrangement of the clamp 50 permits the lamp 44 to be swiveled in the openings 52b and 54b of the plates 52 and 54 thereby enabling the lamp 44 to be positioned at any desired angle on the stand 10. To facilitate the movement of the lamp 44, especially when the lamp is hot, a handle 44b is secured to the back of the base 44a of the lamp.

In FIGS. 16–18 of the drawings, modifications of the clamp 50 are illustrated. The rod 62a joined to the ball 62 is somewhat enlarged, and its outermost end is secured to the base or underside of a plate or table 70 provided with means such as a boss 72 for threadably attaching a camera 74, as shown in FIG. 16, or a telescope 76, as shown in FIG. 18. The clamp 50 enables the camera 74 or telescope 76 to be adjusted to any desired height on a standard while also enabling the angle of the camera or telescope to be positioned at any selected angle.

In FIG. 1, the stand 10 is shown in its folded, compact storage condition. In setting the stand up for use, it is merely necessary to disengage the extensions 14 from the retaining clip 18 and the bracket 22 on the column 16 of the base member 12. The legs 30 are then extended outwardly by downward movement of the sleeve 24 on the column 16 (see FIGS. 2, 3 and 5). At their maximum extension, the legs 30 will provide excellent support for even the tallest stands. After the legs 30 have been extended, the male end 14a of one of the extensions 14 is screwed into the upper end 16a of the column 16. Thereafter, as many extensions as are needed to provide a stand of a desired height are interconnected by successively screwing the male end 14a of one extension into the female end 14b of another extension. The clamp 50 is then secured on the stand 10 by engaging the plates 52 and 54 on one of the extensions 14 at the height selected, and the lamp 44 is swiveled to any desired angle by means of the ball 62 and the rod 62a to provide maximum lighting. More than one lamp 44, of course, can be positioned on the stand, if required.

While the present invention has been described in relation to specific illustrated preferred embodiments thereof, it should be understood that various modifications may be made in the described embodiments without deviating from the broader aspects of the invention.

What is claimed is:

1. A portable stand for supporting a flood lamp or the like, comprising: a base member having a plurality of outwardly extendible legs for maintaining the base member in a stable, upright position, a plurality of separate, interconnectible extensions having an internally threaded female end and an externally threaded male end, an end of at least one of the extensions being connectible to the base member, said extensions, in cooperation with the base member, enabling the stand to have a preselected height, and extension retaining means provided on the base member for storing any one or all of the extensions on the base member when not in use, said extension retaining means including an extension engaging bracket provided with a plurality of openings for receiving the externally threaded male ends of the extensions and an extension retaining clip.

2. A photoflood lamp assembly comprising: a portable stand and a photoflood lamp supported on the stand, said stand including a base member having a plurality of outwardly extendible legs for maintaining the base member in a stable, upright position and a plurality of interconnected separable extensions for enabling the height of the stand to be varied as desired, the base member of the stand also having a column which is connected to one of said extensions, said column having an extension engaging bracket at one end thereof and an extension retaining clip at the other end thereof for enabling all or any of the extensions to be stored on the base member when not in use, a clamp for adjustably supporting the photoflood lamp on the stand, said clamp including a pair of extension engaging plate members, and connector means including a ball for swivably joining the photoflood lamp to the plate members of the clamp whereby the height of the lamp on the stand and the angle of the lamp with relation to a subject can be selectively adjusted.

3. An assembly as claimed in claim 1 wherein the extensions have a female end and a male end which are interengageable with the respective mating ends of each of the other extensions, and the bracket has spaced openings therein for receiving the male end of the extensions during storage of the extensions on the based member.

4. An assembly as claimed in claim 1 wherein sleeve means is slidably mounted on the column of the base member of the stand, the sleeve means having outwardly extending arms pivotally joined to the legs of the base member.

5. An assembly as claimed in claim 1 wherein leg braces are pivotally joined at their lower ends to the bracket on the column of the base member of the stand and at their upper ends to the legs of the base member.

6. An assembly as claimed in claim 4 wherein stop means is provided on the column to limit the downward extent of the movement of the sleeve means.

7. An assembly as claimed in claim 1 wherein the plate members of the clamp are provided with opposed ball receiving openings, and the connector means has an elongated rod one end of which is attached to the photoflood lamp and the other end of which is secured to the ball of the connector means.

8. An assembly as claimed in claim 1 wherein the plate members of the clamp each are provided with an opening therethrough, the opening in one of the plates being tapped, and a handle having a threaded shaft is provided for moving the plate members to a clamping position.

* * * * *